United States Patent
Menne et al.

(10) Patent No.: US 9,291,220 B2
(45) Date of Patent: Mar. 22, 2016

(54) MOTOR VEHICLE DRIVE TRAIN COMPRISING A HYDRODYNAMIC RETARDER THAT CAN BE DISENGAGED, AND CONTROL METHOD THEREFOR

(71) Applicant: Voith Patent GmbH, Heidenheim (DE)

(72) Inventors: Achim Menne, Crailsheim (DE); Tilman Huth, Satteldorf (DE); Dieter Laukemann, Crailsheim (DE); Werner Koch, Deggingen (DE); Werner Klement, Heidenheim (DE); Martin Becke, Ulm (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 14/119,106

(22) PCT Filed: Nov. 28, 2012

(86) PCT No.: PCT/EP2012/073830
§ 371 (c)(1),
(2) Date: Nov. 20, 2013

(87) PCT Pub. No.: WO2013/083458
PCT Pub. Date: Jun. 13, 2013

(65) Prior Publication Data
US 2014/0330495 A1    Nov. 6, 2014

(30) Foreign Application Priority Data
Dec. 9, 2011    (DE) .......................... 10 2011 120 644

(51) Int. Cl.
| | |
|---|---|
| *F16D 57/04* | (2006.01) |
| *F16D 67/02* | (2006.01) |
| *B60T 10/02* | (2006.01) |
| *F16D 48/06* | (2006.01) |

(52) U.S. Cl.
CPC ................. *F16D 57/04* (2013.01); *B60T 10/02* (2013.01); *F16D 48/06* (2013.01); *F16D 67/02* (2013.01)

(58) Field of Classification Search
CPC .................................. B60T 1/087; B60T 10/02
USPC .......................................................... 192/216
See application file for complete search history.

(56) References Cited

U.S. PATENT DOCUMENTS 5,333,707 A * 8/1994 Kaneda .......................... 188/296
5,829,562 A   11/1998 Adams et al.

FOREIGN PATENT DOCUMENTS

| | | |
|---|---|---|
| DE | 44 45 024 | 6/1995 |
| DE | 199 27 397 | 12/2000 |

(Continued)

OTHER PUBLICATIONS

International Search Report dated Feb. 5, 2013 in corresponding International Application No. PCT/EP2012/073830.

*Primary Examiner* — Richard Lorence
(74) *Attorney, Agent, or Firm* — Faegre Baker Daniels LLP

(57) ABSTRACT

A motor vehicle drive train including a hydrodynamic retarder (1) that comprises a revolving bladed impeller (10) and a stationary or counter-rotating bladed turbine (11) which jointly form a working chamber (12) that can be filled with a working medium to switch on the retarder (1) is disclosed. The hydrodynamic retarder (1) can be mechanically disengaged from the drive train by a disconnect clutch (2). A fill level monitoring device (14) can detect the current fill level of the working medium in the working chamber (12), while a disconnect clutch-blocking device (9) is effectively connected in a communicating or mechanical manner to the fill level monitoring device (14) and prevents the disconnect clutch (2) from engaging in accordance with the detected fill level.

14 Claims, 1 Drawing Sheet

(56) References Cited

FOREIGN PATENT DOCUMENTS

Figure 1:
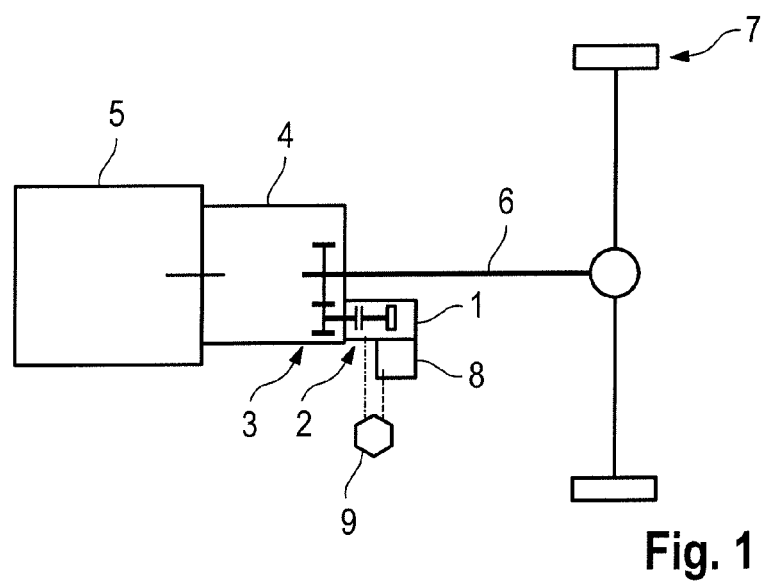

| DE | 10 2005 052 121 | 5/2007 |
| DE | 10 2009 001 146 | 8/2010 |
| EP | 2 024 209 | 4/2011 |
| WO | 03/020562 | 3/2003 |

* cited by examiner

MOTOR VEHICLE DRIVE TRAIN COMPRISING A HYDRODYNAMIC RETARDER THAT CAN BE DISENGAGED, AND CONTROL METHOD THEREFOR

CROSS-REFERENCE TO RELATED APPLICATION

The present application is a National Stage of International Application No. PCT/EP2012/073830, filed Nov. 28, 2012, which claims priority to German Application No. 10 2011 120 644.6, filed Nov. 9, 2011, the entire disclosures of which are hereby expressly incorporated herein by reference.

The present invention concerns a motor vehicle drive train, having a hydrodynamic retarder which can be disengaged mechanically from the drive train by means of a separating clutch, as well as its control method.

Hydrodynamic retarders have been used for many years as wear-free continuous brakes in motor vehicles on tracks as well as on the road, the latter in particular in lorries. Although such wear-free continuous brakes indisputably entail considerable benefits in terms of safety when braking the vehicle and in terms of reduced wear of the frictional service brakes, the no-load losses in non-braking mode of the hydrodynamic retarder constitute a critical point. Said no-load losses could still be decreased by providing so-called ventilation plates or by providing a rotor (primary wheel) outgoing from the stator (secondary wheel) in non-braking mode, the measure aforementioned in particular is hence usually insufficient to bring the no-load losses down to practically zero.

A possibility to bring down to zero the no-load losses of such a hydrodynamic retarder consists in designing the hydrodynamic retarder by means of a separating clutch which can be disengaged from the drive train. However, there are the following shortcomings: On the one hand, the time for closing the separating clutch is added to the time for filling the hydrodynamic retarder, which lengthens the reaction time of the hydrodynamic retarder between the activation request for the hydrodynamic retarder and providing of the required braking torque by the hydrodynamic retarder. On the other hand, the separating clutch, which in particular is designed as a friction coupling, may due to the high constraints, in particular when switching on the hydrodynamic retarder, cause maintenance to be required early or components to be replaced compared to drive trains with hydrodynamic retarders, which are connected to the drive train without a separating clutch.

The European patent document EP 2 024 209 B1 suggest for shortening the reaction time of a hydrodynamic retarder connected to the drive train via a separating clutch, to preventively close the separating clutch every time there is no traction of the motor vehicle and to couple the retarder in emptied condition.

Publication DE 199 27 397 A1 suggests a self-reinforcing friction coupling for engaging the hydrodynamic retarder, which enables to engage the hydrodynamic retarder also in filled condition.

Publication DE 10 2005 052 121 A1 suggests switching off a hydrodynamic retarder by emptying its working chamber and simultaneously releasing the stator, so that the latter may spin with the rotor.

Publication DE 10 2009 001 146 A1 offers a coaxial arrangement of the rotor of the retarder and of the rotor of an electric motor which can be disconnected together from the drive train via a separating clutch, in particular a desynchronised separating clutch.

The object of the present invention is to provide a motor vehicle drive train having a hydrodynamic retarder which can be disengaged mechanically from the drive train by means of a separating clutch, as well as its control method, with which the shortcomings illustrated above can be reduced or avoided. The solution according to the invention should be characterised by a simple structural and cost-effective configuration.

A motor vehicle drive train according to the invention comprises a hydrodynamic retarder. The hydrodynamic retarder includes a rotating bladed primary wheel and a stationary secondary wheel (stator) or a bladed secondary wheel (counter-rotating retarder) rotating in opposite direction to the primary wheel which together form a working chamber which can be filled with a working medium. The working chamber is filled with working medium to switch on the retarder, whereas the quantity of working medium situated in the working chamber, which forms a hydrodynamic circular flow in the working chamber, determines the torque transmitted from the primary wheel to the secondary wheel and hence the braking torque. Normally, the retarder can be switched in different braking steps.

The hydrodynamic retarder can be disengaged mechanically from the drive train by means of a separating clutch. The separating clutch is designed in particular as a wet or dry running friction clutch, by way of example as lamella clutch. The separating clutch can have a bridging mechanism, which locks the primary side and the secondary side of the clutch together after synchronisation, in particular in a positively locking manner or engaging into another, to increase the torque which can be transmitted. According to an embodiment, the separating clutch is sized in a manner that it has a maximum torque transmissibility in frictional mode, which is lower than that of the hydrodynamic retarder filled to a certain extent or filled completely.

By separating clutch should be understood here every component which in a first operating mode creates a power transmission, in particular a mechanical power transmission and in a second operating mode interrupts said transmission, consequently for instance synchronous elements, friction clutches and others.

According to the invention, a filling level monitoring device is provided, which detects the current filling level of the working medium in the working chamber. The detection can hence take place immediately in the working chamber or indirectly, outside said chamber. For instance, the filling level can be detected in an auxiliary chamber of the hydrodynamic retarder, which is more or less filled with working medium according to the filling level in the working chamber and which is designated in this instance as a communicating auxiliary chamber with reference to the principle of communicating vessels.

The filling level can be detected quantitatively or qualitatively. When the filling level is detected quantitatively, the system only determines whether working medium can be found at all in the working chamber of the retarder or whether said chamber is emptied. When the filling level is detected qualitatively, the concrete filling level is detected continuously or in various stages. The detection can take place moreover permanently or in intervals.

According to the invention, a separating clutch blocking device is provided which is in communicating or mechanical operative connection with the filling level monitoring device and blocks the closing of the separating clutch according to the filling level detected. Such a separating clutch blocking device can be designed as a purely electronic control device which emits a corresponding closing and/or blocking signal to authorise the closing or the blocking of the closing of the separating clutch. Alternately, the separating clutch blocking device can be designed as a physically or mechanically operating mechanism. Hybrid forms can also be envisioned. According to an advantageous embodiment, the filling level monitoring device has a floater arranged in the working chamber of the retarder or a floater arranged in an auxiliary chamber communicating with the working chamber according to the filling level of working medium.

Additionally or alternatively, the filling level monitoring device can include an electric, optical or acoustic sensor and an associated interpreting unit, by means of which the filling level of the working chamber or another auxiliary chamber of the retarder communicating with working medium according to the filling level communicating is detected by an electric resistance measurement, an optic signal measurement or an acoustic signal measurement.

Advantageously, a control device is associated to or integrated in the filling level monitoring device or the separating clutch blocking device, which detects, receives or calculates as an input variable the current rotational speed of the primary side of the separating clutch, side facing away from the retarder and additionally controls the closing of the separating clutch as a function of the rotational speed.

The control device can for instance calculate a limit rotational speed related to the filling level or resort to a filling level-related characteristic limit rotational speed line or characteristic limit rotational speed curve, which in particular is/are accommodated in the control device, whereas the control device blocks the closing of the separating clutch by means of the separating clutch blocking device in case of filling levels, when the corresponding current rotation speed lies above the corresponding limit rotational speed or characteristic limit rotational speed line. It has the following explanation: Although the closing of the separating clutch due to the comparatively low trans-mission capacity in frictional mode when the working chamber of the retarder is filled, i.e. when a braking torque is thus created, can be considered as dangerous basically in terms of durability of the separating clutch, such a closing in the presence of comparatively small rotational speeds of the primary side of the separating clutch, i.e. when accelerating the retarder to obtain comparatively small rotational speeds by closing the separating clutch, be acceptable, since indeed the braking torque generated by the retarder depends on the speed, relative to the peripheral speed of the primary wheel of the retarder. It means at the same time that a quicker closing of the separating clutch or a quicker activation of the retarder is possible according to the actual rotational speed.

If the motor vehicle drive train is basically designed in such a way that the retarder, to be more precise its working chamber, is in deactivated mode, i.e. in the absence of activation request for the retarder, should be emptied, then the presence of working medium in the working chamber of the retarder in this state has an undesirable result. The consequence of this result can be that the closing of the separating clutch is prevented or blocked during the following activation request for the retarder due to the measures according to the invention, and hence the availability of the retarder is restricted. Now to increase again the availability of the retarder in such an undesirable state it may be provided in an embodiment according to the invention that measures are introduced in case of blocking the closing of the separating clutch, measures which should induce an emptying of the working chamber in the next possible or favorable moment. The system may then wait by way of example after the afore mentioned state of the blocking of the closing of the separating clutch until the rotational speed of the primary side of the separating clutch falls to a current value below the limit rotational speed or characteristic limit rotational speed line and than the separating clutch is closed also without any activation request or any activation signal for the retarder, so that the rotor of the same (at least the primary wheel) is brought into rotation and the working chamber is then pumped dry.

According to this embodiment according to the invention, the control device can have a retarder activation signal input to which a signal is applied, which signals an activation request for the retarder and the control device causes the mentioned blocking of the closing of the separating clutch in spite of activation request, and after the blocking, as soon as a current rotational speed lies below the limit rotational speed or the characteristic limit rotational speed line, independent of any further activation request or also then, in the absence of any activation request, activate the closing of the separating clutch.

In an alternative embodiment of the invention, the emptying of the working chamber of the retarder, if the appropriate conditions for filling are not met and the closing of the separating clutch was blocked accordingly, also by means of another unit, can take place by way of example by driving the primary wheel and/or the secondary wheel of the hydrodynamic retarder, using an additional motor, in particular an electric motor or the working compartment can be pumped dry using a pump.

The invention will now be described by way of example using an embodiment.

Figure 2:
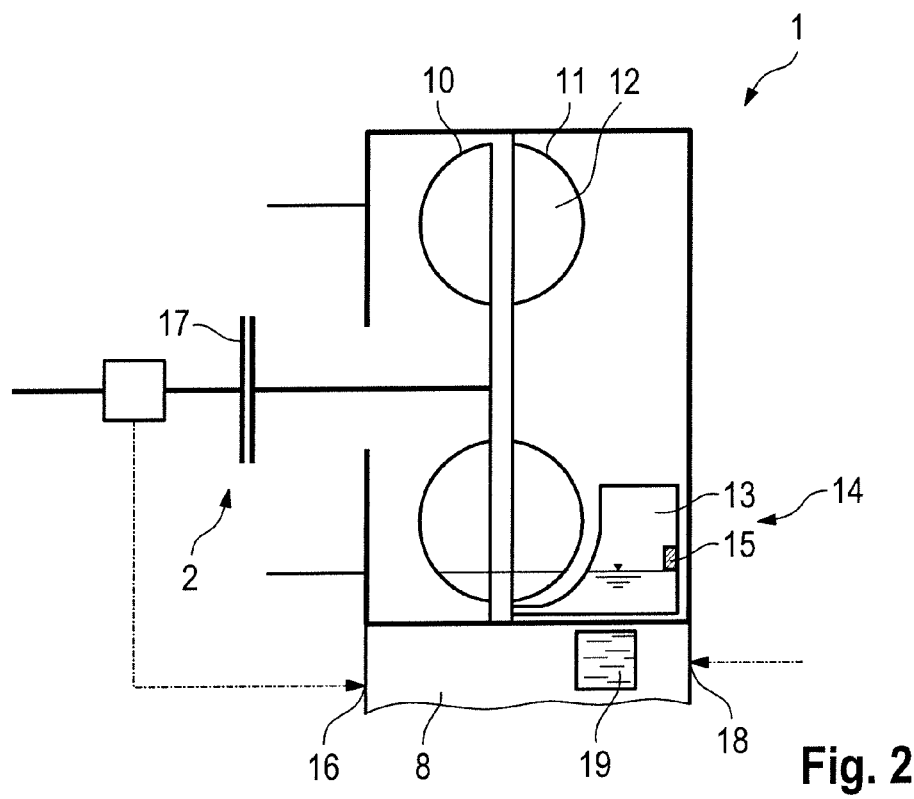

The figures are as follows:

FIG. 1 is a schematic view of a secondary retarder, which is connected to the drive train of a motor vehicle via a separating clutch;

FIG. 2 a schematic detailed view of the retarder of FIG. 1.

The figures show the hydrodynamic retarder 1, which is connected to the motor vehicle drive train 3, here an auxiliary power takeoff 3 in the form of a stepping-up drive of the transmission 4 via a separating clutch 2. The transmission 4 is a range change transmission, in particular an automatic transmission or automated shift transmission of a motor vehicle, which is driven by the engine, in particular a combustion engine 5, on the inlet side and drives the drive wheels 7 of the motor vehicle on the outlet side via a transmission output shaft 6. A control device 8 is associated with the retarder 1 a device which actuates at least the opening and closing of the separating clutch 2 or, in case it is controlled by another device, blocks the closing of the separating clutch 2. The control device 8 can itself exhibit either the separating clutch blocking device or resort to such a device, designated with the reference sign 9 on FIG. 1.

The detailed view of FIG. 2 represents the bladed primary wheel 10 of the retarder 1. Said wheel is opposite to the bladed secondary wheel 11, designed here as a stator and forms together with said stator the working chamber 12. Moreover, the hydrodynamic retarder 1 has an auxiliary chamber whose filling level with working medium is proportional to that of the working chamber 12. A filling level monitoring device 14 is provided in the auxiliary chamber 13, here a floater 15.

The control device 8 has an inlet 16 for the rotational speed of the primary side 17 of the separating clutch 2. Moreover, the control device has a retarder activation signal input to which a signal is applied, which signals an activation request for the retarder. Such an activation request can be output by way of example by the vehicle driver by operating an actuator or a control lever or by a regulating device of the vehicle, by way of example a cruise controller or a speed governor.

A characteristic line or several characteristic lines of a limit rotational speed related to the filling level are stored in memory 19 in the control device 8. Alternately or additionally, the control device 8 can calculate a corresponding limit rotational speed constantly from current input variables. Input variables can by way of example be made available by a CAN-bus.

The invention claimed is:

1. Motor vehicle drive train comprising:
 a hydrodynamic retarder comprising a rotating bladed primary wheel and a bladed secondary wheel which is one of stationary and rotating in opposite direction to the primary wheel, which form together a working chamber which can be filled with a working medium to switch on the retarder, whereas
 the hydrodynamic retarder can be disengaged mechanically from the drive train by means of a separating clutch,
 a filling level monitoring device, which detects current filling level of the working medium in the working chamber and
 a separating clutch blocking device, which is in one of communicating and mechanical operative connection with the filling level monitoring device and blocks the closing of the separating clutch according to the current filling level detected.

2. Motor vehicle drive train according to claim 1, wherein the filling level monitoring device comprises one of a floater arranged in the working chamber of the retarder and a floater arranged in an auxiliary chamber communicating fluidly with the working chamber in respect of the current filling level of working medium.

3. Motor vehicle drive train according to claim 2, wherein the filling level monitoring device comprises one of an electric, an optical and an acoustic sensor and an associated interpreting unit, by means of which the filling level of one of the working chamber and an auxiliary chamber of the retarder communicating fluidly with working chamber in respect of the current filling level is detected by one of an electric resistance measurement, an optic signal measurement and an acoustic signal measurement.

4. Motor vehicle drive train according to claim 2, wherein a control device is one of associated to and integrated in one of the filling level monitoring device and the separating clutch blocking device, which one of detects, receives and calculates as an input variable a current rotational speed of a primary side of the separating clutch side facing away from the retarder and additionally controls the closing of the separating clutch as a function of the current rotational speed.

5. Motor vehicle drive train according to claim 1, wherein the filling level monitoring device comprises one of an electric, an optical and an acoustic sensor and an associated interpreting unit, by means of which the filling level of one of the working chamber and an auxiliary chamber of the retarder communicating fluidly with working chamber in respect of the current filling level is detected by one of an electric resistance measurement, an optic signal measurement and an acoustic signal measurement.

6. Motor vehicle drive train according to claim 5, wherein a control device is one of associated to and integrated in one of the filling level monitoring device and the separating clutch blocking device, which one of detects, receives and calculates as an input variable a current rotational speed of a primary side of the separating clutch side facing away from the retarder and additionally controls the closing of the separating clutch as a function of the current rotational speed.

7. Motor vehicle drive train according to claim 1, wherein a control device is one of associated to and integrated in one of the filling level monitoring device and the separating clutch blocking device, which one of detects, receives and calculates as an input variable a current rotational speed of a primary side of the separating clutch side facing away from the retarder and additionally controls the closing of the separating clutch as a function of the current rotational speed.

8. Motor vehicle drive train according to claim 7, wherein the control device one of: calculates a limit rotational speed related to the filling level; and stores one of a characteristic a limit rotational speed line and a characteristic limit rotational speed curve related to the filling level, and the control device blocks the closing of the separating clutch by means of the separating clutch blocking device in case of filling levels, when the corresponding current rotational speed lies above the corresponding limit rotational speed or characteristic limit rotational speed line.

9. Motor vehicle drive train according to claim 8, wherein the control device has a retarder activation signal input to which a signal is applied, which signals an activation request for the retarder and the control device causes the blocking of the closing of the separating clutch in spite of the activation request, and after the blocking, as soon as a current rotational speed lies below one of: the limit rotational speed; and one of the characteristic limit rotational speed line and the characteristic limit rotational speed curve, initiates the closing of the separating clutch independent of another activation request.

10. Method for controlling a motor vehicle drive train having a hydrodynamic retarder which can be filled and emptied with a working medium, and which can be disengaged mechanically from the drive train by means of a separating clutch, comprising the following steps:
 receiving a signal of an activation request for the retarder when the separating clutch is opened,
 detecting a filling level of the working medium in a working chamber of the retarder, which working chamber is formed by a bladed primary wheel and a bladed secondary wheel, and
 blocking the closing of the separating clutch according to the filling level detected.

11. Method according to claim 10, further comprising the step of closing the separating clutch only when the working chamber has been emptied of working medium.

12. Method according to claim 10, wherein the step of blocking the closing of the separating clutch according to the filling level detected comprises closing the separating clutch according to the filling level and to a current rotational speed of a primary side of the separating clutch, which primary side facing away from the retarder, whereby a closing takes place in the presence of comparatively small rotation speeds also with a working chamber filled with working medium and a closing takes place in the presence of comparatively larger rotational speeds only with an emptied working chamber.

13. Method according to claim 12, further comprising providing one of a limit rotational speed and a characteristic limit rotation speed line, by means of which at least one maximal admissible filling level is associated to a rotational speed of the primary side of the separating clutch and the closing of the separating clutch is blocked when the current rotational speed of the primary side is above one of the limit rotational speed and the characteristic limit rotational speed lines and said closing is admitted below said values.

14. Method according to claim 13, wherein, after the blocking of the closing of the separating clutch the method comprises the step of closing the separating clutch if the rotational speed of the primary side of the separating clutch falls to a current value below one of the limit rotational speed and the characteristic limit rotational speed line, also without an activation request for the retarder, to empty the retarder.

* * * * *